(12) United States Patent
Peterson et al.

(10) Patent No.: US 12,719,890 B2
(45) Date of Patent: Aug. 25, 2026

(54) DEVICE ANOMALY DETECTION BASED ON DNS QUERIES

(71) Applicant: Infoblox Inc., Santa Clara, CA (US)

(72) Inventors: Mark Edward Peterson, Barrington, IL (US); Fatemeh Riahi, Burnaby (CA); Marjan Rouhipour, North Vancouver (CA)

(73) Assignee: Infoblox Inc., Santa Clara, CA (US)

( * ) Notice: Subject to any disclaimer, the term of this patent is extended or adjusted under 35 U.S.C. 154(b) by 16 days.

(21) Appl. No.: 18/892,164

(22) Filed: Sep. 20, 2024

(65) Prior Publication Data

US 2026/0067297 A1 Mar. 5, 2026

Related U.S. Application Data

(60) Provisional application No. 63/687,546, filed on Aug. 27, 2024.

(51) Int. Cl.
*H04L 9/40* (2022.01)

(52) U.S. Cl.
CPC ................................ *H04L 63/1416* (2013.01)

(58) Field of Classification Search
CPC .................................................. H04L 63/1416
See application file for complete search history.

(56) References Cited

U.S. PATENT DOCUMENTS 9,942,235 B2 * 4/2018 Bagasra .............. H04L 61/4511
12,218,968 B1 * 2/2025 Harb ..................... H04L 63/145
2010/0034102 A1 2/2010 Wang
2012/0284791 A1 * 11/2012 Miller .................. G06F 21/554 726/22
2016/0065597 A1 3/2016 Nguyen
2016/0065611 A1 * 3/2016 Fakeri-Tabrizi .... H04L 63/1441 726/23
2016/0171115 A1 * 6/2016 Jheeta .................. G06F 16/951 707/723
2016/0294773 A1 10/2016 Yu
2016/0294852 A1 10/2016 Hagen
2017/0026390 A1 1/2017 Sofka
2017/0039267 A1 2/2017 Shmiel
2017/0041333 A1 * 2/2017 Mahjoub ............. H04L 43/0876
2018/0255083 A1 9/2018 Rao
2019/0014137 A1 1/2019 Du
2019/0081958 A1 3/2019 Lee
2019/0095512 A1 3/2019 Mahjoub
2019/0253319 A1 8/2019 Kampanakis (Continued)

OTHER PUBLICATIONS

Douze et al., The Faiss Library, Jan. 16, 2024, pp. 1-21.

(Continued)

*Primary Examiner* — Blake I Narramore
(74) *Attorney, Agent, or Firm* — Van Pelt, Yi & James LLP

(57) ABSTRACT

Techniques for providing device anomaly detection based on DNS queries are disclosed. In some embodiments, a system, a process, and/or a computer program product for device anomaly detection based on DNS queries includes receiving Domain Name System (DNS) network activity, wherein the DNS network activity includes a plurality of DNS queries; processing the DNS network activity to generate a plurality of metrics; and automatically detecting anomalies associated with one or more devices for a monitored network.

20 Claims, 10 Drawing Sheets

(56) References Cited

U.S. PATENT DOCUMENTS

2020/0169570 A1 5/2020 Kleymenov
2020/0304455 A1 9/2020 Karkhanis
2020/0314107 A1 10/2020 Joshi
2020/0389430 A1 12/2020 Di Mattia
2021/0099415 A1 4/2021 Kanagarathinam
2021/0099481 A1 4/2021 Mallis
2021/0152578 A1 5/2021 Alanazi
2021/0176181 A1* 6/2021 Arora .......................... G06N 3/08
2021/0203615 A1 7/2021 Roy
2021/0385230 A1 12/2021 Joshi
2022/0086071 A1 3/2022 Sivaraman
2022/0200950 A1 6/2022 Sekar
2023/0123625 A1 4/2023 Ojha
2023/0246972 A1 8/2023 Kerur
2023/0289168 A1* 9/2023 Sethi .......................... G06F 8/65
2024/0154987 A1* 5/2024 Rathor ................ H04L 63/1416
2024/0205240 A1* 6/2024 Duan .................. H04L 63/1466
2024/0333613 A1 10/2024 Naik
2024/0372782 A1 11/2024 Lars
2025/0175776 A1* 5/2025 Purkayastha ....... H04L 67/1014

OTHER PUBLICATIONS

Ge et al., Deep Learning-based Intrusion Detection for IoT Networks, 2019 IEEE 24th Pacific Rim International Symposium on Dependable Computing (PRDC), pp. 256-265.

Jegou et al., Faiss: A Library for Efficient Similarity Search, Engineering at Meta, Posted on Mar. 29, 2017 to AI Research, Data Infrastructure, ML Applications, pp. 1-12.

Karatas et al., Deep Learning in Intrusion Detection Systems, International Congress on Big Data, Deep Learning and Fighting Cyber Terrorism, Ankara, Turkey, Dec. 3-4, 2018, pp. 166-169.

Shamshari et al., Machine Learning Approaches for Anomaly Detection in Network Security, Mar. 2024, 13 pages.

* cited by examiner

DEVICE ANOMALY DETECTION BASED ON DNS QUERIES

CROSS REFERENCE TO OTHER APPLICATIONS

This application claims priority to U.S. Provisional Patent Application No. 63/687,546 entitled DEVICE ANOMALY DETECTION BASED ON DNS QUERIES filed Aug. 27, 2024, which is incorporated herein by reference for all purposes.

BACKGROUND OF THE INVENTION

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain.

BRIEF DESCRIPTION OF THE DRA WINGS

Various embodiments of the invention are disclosed in the following detailed description and the accompanying drawings.

DETAILED DESCRIPTION

Figure 1:
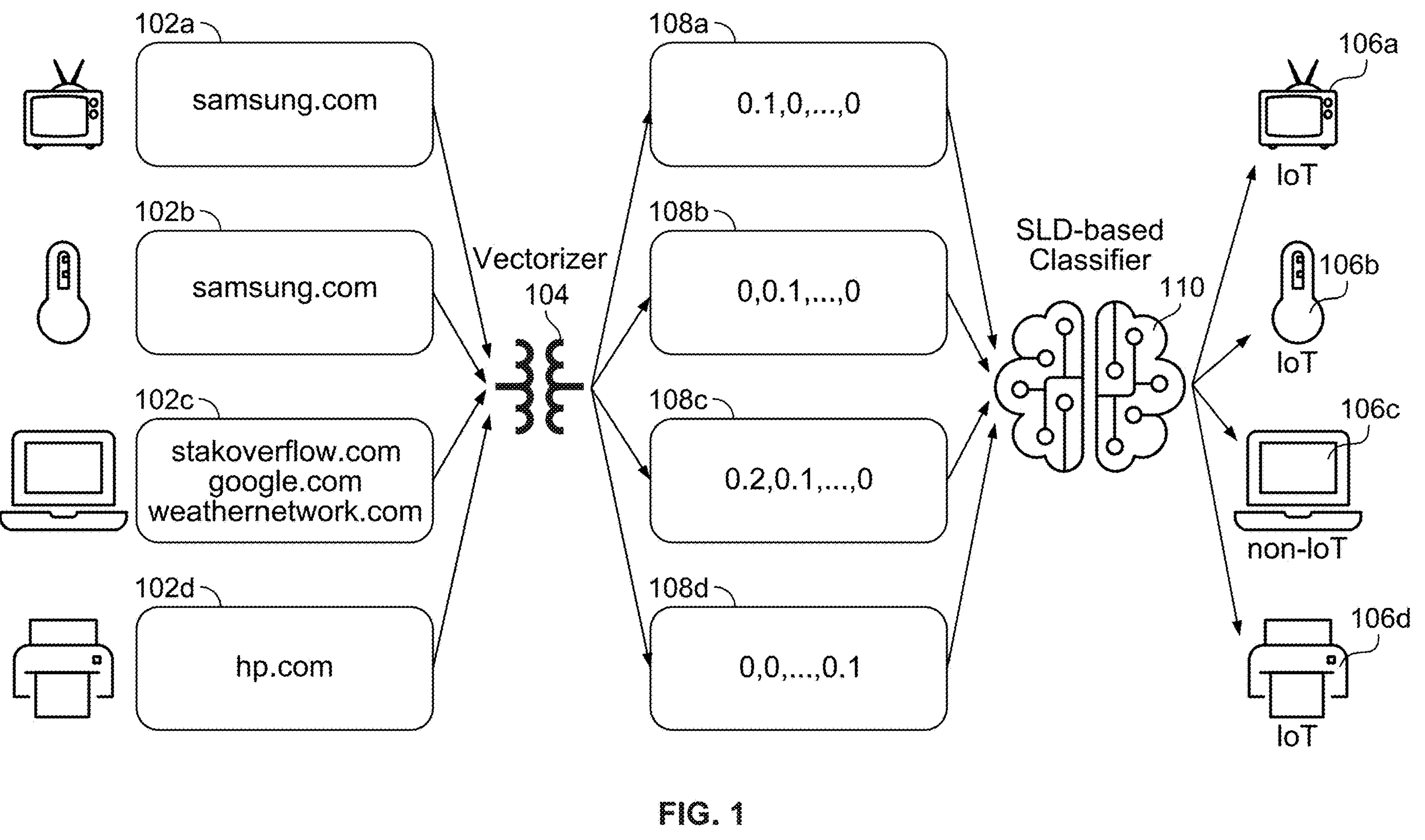
FIG. 1 is a system diagram for a system architecture for providing device classification and anomaly detection using DNS queries in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Domain Name System network services are generally ubiquitous in IP-based networks. Generally, a client (e.g., a computing device) attempts to connect to a server(s) over the Internet by using web addresses (e.g., Uniform Resource Locators (URLs) including domain names or fully qualified domain names (FQDNs)). Web addresses are translated into IP addresses. The Domain Name System (DNS) is responsible for performing this translation from web addresses into IP addresses. Specifically, requests including web addresses are sent to DNS servers that generally reply with corresponding IP addresses or with an error message in case the domain has not been registered, a non-existent domain (e.g., an NX Domain response is returned by DNS servers for a non-existent domain).

Overview of Techniques for Device Classification Using DNS Queries

Various techniques for providing device classification using DNS queries are disclosed. The disclosed solution can be implemented in various system, process, and/or computer program embodiments, such as will be further described below with respect to various embodiments.

In some embodiments, a system, a process, and/or a computer program product for device classification using DNS queries includes receiving Domain Name System (DNS) network activity, wherein the DNS network activity includes a plurality of DNS queries; processing the DNS network activity using a plurality of classifiers; and automatically classifying one or more devices.

In some embodiments, the plurality of classifiers includes a second-level domain (SLD)-based classifier.

In some embodiments, the plurality of classifiers includes a name-based classifier.

In some embodiments, the plurality of classifiers includes a second-level domain (SLD)-based classifier and a name-based classifier that are applied to collaboratively determine whether the one or more devices belong to an Internet of Things (IoT) category or a non-IoT category.

In some embodiments, the plurality of classifiers includes a statistical (stat)-based classifier.

In some embodiments, the plurality of classifiers includes an ensemble-based classifier.

In some embodiments, the plurality of classifiers includes a second-level domain (SLD)-based classifier and a name-based classifier that are applied to collaboratively determine whether the one or more devices belong to an Internet of Things (IoT) category or a non-IoT category, and wherein the plurality of classifiers further includes an ensemble-based classifier that is applied to further categorize the one or more devices into specific device types.

In some embodiments, the plurality of classifiers includes a second-level domain (SLD)-based classifier and a name-based classifier that are applied to collaboratively determine whether the one or more devices belong to an Internet of Things (IoT) category or a non-IoT category, and wherein the plurality of classifiers further includes an ensemble-based classifier that is applied to further categorize the one or more devices into specific device types that include laptops, printers, and/or cameras.

In some embodiments, the classification of the one or more devices is sent to a cloud-based DNS security.

In some embodiments, a system, a process, and/or a computer program product for device classification using DNS queries further includes performing an action based on the classification of the one or more devices. For example, a classified device can be added to an allow list or to a block list based on a security policy for the enterprise network. Various other example actions can be similarly performed based on the classification of the one or more devices (e.g., quarantine, log for further security analysis, report to a user/admin, and/or other actions).

In some embodiments, a system, a process, and/or a computer program product for device classification using DNS queries further includes blocking the one or more devices for at least a predetermined period of time based on a DNS security policy in response to classification of at least one of the one or more devices into a specific device type.

In some embodiments, a system, a process, and/or a computer program product for device classification using DNS queries further includes reporting the one or more devices for at least a predetermined period of time based on a DNS security policy in response to classification of at least one of the one or more devices into a specific device type.

Thus, new and improved techniques for device classification using DNS queries are further described below.

Example System Embodiments for Device Classification Using DNS Queries

Example system embodiments for providing device classification using DNS queries are disclosed. The disclosed new techniques for device classification using DNS queries provide significant improvements over the existing, conventional approach.

The conventional approach involves the use of a DHCP server, which identifies device types based on their patterns of requesting DHCP leases. However, this approach encounters limitations in scenarios where devices intentionally obfuscate their information or abstain from sending requests to the DHCP server.

Moreover, it is noteworthy that certain customers (e.g., enterprise customers of DNS solutions) may prefer to procure only the DNS component of a given product suite (e.g., such as DNS and DHCP product suite offerings from Infoblox Inc., headquartered in Santa Clara, CA). As such, the disclosed techniques provide a mechanism to offer automated device identification using DNS query patterns, even in the absence of the DHCP component.

In this context, a range of device type classifiers is disclosed. The disclosed device type classifiers are uniquely designed to leverage the DNS and DHCP information available, thereby enhancing the effectiveness of automated device identification. In an example implementation, four device type device classifiers have been developed for automated device classification as will now be further described below.

A first classifier is based on the analysis of second-level domains (SLDs). The central hypothesis driving this SLD-based classifier is the observation that devices of a similar nature tend to request similar domains. By examining the patterns in these domain queries, this classifier can identify and categorize devices based on the commonalities in their Internet behavior. For example, this approach is particularly effective in discerning device types through their digital footprints, leveraging the SLD data to draw meaningful conclusions about the device's characteristics and functions.

A second classifier operates by analyzing the names of devices. It transforms these names into feature vectors, utilizing the principle that devices of similar types often bear resemblances in their naming conventions. As such, this technique using a name-based classifier allows us to capture the essence of a device's identity through its name, leveraging linguistic patterns and similarities to categorize the devices. For example, this approach is especially adept at identifying and grouping devices based on semantic and syntactic cues present in their names.

A third classifier adopts a different perspective, focusing on the timing and frequency of device queries rather than the content of the queries themselves. This temporal and frequency-based pattern classifier (e.g., also referred to herein as a statistical (stat)-based classifier) is predicated on the idea that devices operated by humans exhibit less consistent behavior patterns in their query timings and frequencies, whereas autonomous devices often demonstrate more consistent querying patterns over a given period of time (e.g., a period of several days or weeks, etc.). By analyzing these temporal and frequency-based patterns, this classifier can distinguish between devices with human-driven versus autonomous operations. For example, this technique innovatively looks beyond the surface-level data, delving into the behavioral patterns that are indicative of the device's operational context and usage.

A fourth classifier is an ensemble approach combining a device's affinity for querying particular SLDs together with the statistics of its querying frequency. This technique combines the ability to capture the SLDs characteristic to a device together with the frequency patterns in a way that is more subtle than a basic concatenation of the two individually. Specifically, this ensemble-based classifier adopts a two-staged approach. In the first stage, a closeness between devices based on the SLDs that they have queried and frequency statistics together are determined. The devices are then put into a vector database (e.g., using FAISS, which is publicly available at https://engineering.fb.com/2017/03/29/data-infrastructure/faiss-a-library-for-efficient-similarity-search/, or another vector database can similarly be used) and new devices can be looked up in the database to see which device they most resemble (e.g., based on a relative distance within the embedded vector space) and inferences can be made about the type of device, as well as further characteristics such as vendor and operating system (OS) (e.g., and/or other attributes).

As will be further described below, an example system implementation utilizing the above-described four classifiers in combination can provide a comprehensive and multifaceted approach to automated device identification. Each classifier contributes a unique perspective, enhancing the overall accuracy and efficiency of the disclosed device identification system. The integration of these classifiers allows us to leverage a rich array of data points and insights, ensuring a more nuanced and precise understanding of the devices within a given enterprise network.

In an example implementation, the first two classifiers (i.e., the SLD-based classifier and the name-based classifier) collaboratively determine whether a device belongs to the Internet of Things (IoT) category or the non-IoT category by taking a weighted average of their individual decisions. In this example implementation, the name-based classifier is used only when the device has a name and the other two classifiers have low confidence in their labels. However, the name-based classifier can also be used more extensively (e.g., if we have a majority of devices with names and the other classifiers are uncertain, etc.). Once a device is classified as IoT or non-IoT, then the fourth classifier (i.e., the stat-based classifier) further categorizes it into specific device types, such as laptops, printers, cameras, etc. This tiered approach ensures a detailed and accurate classification, enabling a more effective and comprehensive device identification system and process, such as will now be further described below with respect to FIG. 1.

FIG. 1 is a system diagram for a system architecture for providing device classification and anomaly detection using DNS queries in accordance with some embodiments. Specifically, FIG. 1 provides a snapshot of the SLD-based classifier shown at 110, illustrating how each device's DNS activity is translated into a vector as shown at 108*a*, 108*b*, 108*c*, and 108*d*, with these vectors and their associated device types serving as the classifier's input. The output of the SLD-based classifier 110 is to categorize these devices into IoT and non-IoT device categories, and as further discussed below, into potentially more granular IoT/device types (e.g., specific device types), such as shown at 106*a*, 106*b*, 106*c*, and 106*d*.

Name-Based Classifier

As similarly described above, the system architecture includes a Name-based Classifier. The Name-based Classifier operates on the premise that devices sharing similar names are likely to belong to the same type. Various devices with different names can be provided as input to the name-based classifier, which generates vectors for each of their names as similarly described above.

Data Preprocessing

Data processing by the disclosed techniques is performed to accurately identify the broader category of each device, utilizing a system that is tailored for recognizing higher-level classifications rather than granular details. The data for this task comes from a specialized tagging workflow, where DNS records are annotated with basic information about the associated device, such as its name and a general type description. Instead of focusing on highly specific device types, these devices are categorized into more general groups, such as network elements or IoT devices.

Specifically, these general device type categories are employed as labels in our supervised machine learning (ML)-based classifiers. By doing so, a robust and informative profile can be generated for each device, which is based on its broader classification rather than on detailed specifics. This technique enables the disclosed classifiers to more accurately and efficiently categorize devices, focusing on the essential characteristics that define their general category.

SLD-Based Classifier

In this example implementation, the SLD-based classifier 110 functions by analyzing the second-level domain (SLD) in DNS queries linked to specific devices, such as shown at 102*a*, 102*b*, 102*c*, and 102*d*. Specifically, machine learning techniques (e.g., TFIDF, Word2Vec) are applied by converting these SLD lists into vector formats as shown at 108*a*, 108*b*, 108*c*, and 108*d*, a process known as vectorization using a vectorizer 104 (e.g., for providing vector embeddings). As such, numerical values are assigned to each domain and SLD, indicating their importance for each device and across the entire dataset.

To make our approach clearer, we draw parallels with natural language processing (NLP) concepts, such as described below.

The "Word" in our context is an SLD or a qualified name (qname).

A "Sentence" equates to a collection of DNS queries from a single device within a set time, such as 20 minutes or a day. We use mac addresses as device identifiers.

The "Corpus" represents our entire collection of unique domains.

A "Document" refers to all the gathered sentences.

For assessing the relevance of each SLD within a single device and across an entire device pool, various techniques can be effectively and efficiently applied, including, for example, term frequency-inverse document frequency (TFIDF), Word2Vec, and/or GloVe. These methods consider both the frequency of a device's queries for an SLD and the count of different devices querying the same SLD. This dual approach facilitates a reduction of the influence of commonly queried domains, such as "google.com," which might be accessed by a wide variety of devices.

Once the feature vectors are generated, a process of training the various classifiers is performed to determine the most effective approach. This exploratory phase involved evaluating different machine learning (ML) models to determine which ML models yielded the highest performance in terms of precision and recall. Ultimately, we found that the HistGradientBoosting classifier was the most proficient for the disclosed application, standing out with its impressive accuracy. Other ML models that can similarly be used include random Forest, Support Vector Machines, Neural Networks, and Logistic Regression.

In experiments using data from one month of our customer DNS activity, the HistGradientBoosting classifier achieved a precision of 0.91, indicating that when it predicts a device as autonomous, it is correct 91% of the time. Additionally, it demonstrated a recall rate of 0.83, meaning it successfully identified 83% of all autonomous devices present in the dataset. These results were obtained by training the classifier on the one-month dataset and testing it on a separate day that was not included in the training data. This combination of high precision and recall showcases the classifier's strength in reliably distinguishing autonomous devices from others within the specific context of our network and data.

Figure 2:
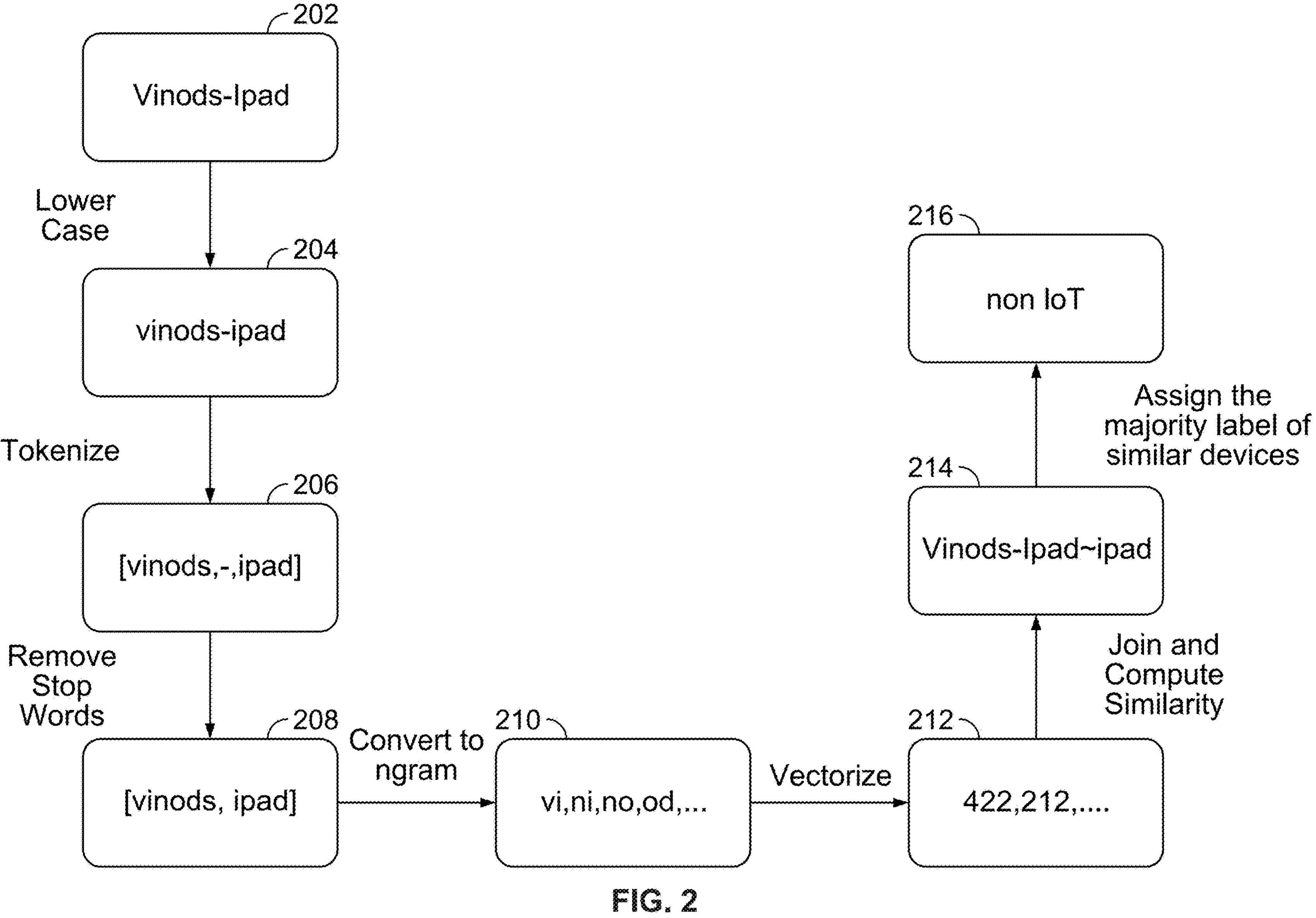
FIG. 2 illustrates a name-based classifier flow performed by the system for providing device classification using DNS queries in accordance with some embodiments.

FIG. 2 illustrates a name-based classifier flow performed by the system for providing device classification using DNS queries in accordance with some embodiments. Specifically, FIG. 2 illustrates a snapshot of the name-based classifier workflow, illustrating each step of data processing for an input received at 202, including lower case (204), tokenizing (206), removing stop words (208), n-gram conversion (210), vectorizing (212), joining and computing a similarity (214), and determining the majority label of the most similar names to the device name (216).

More specifically, FIG. 2 illustrates our methodological framework in this example implementation as will now be described below.

Preprocessing and Transformation: Initially, device names undergo preprocessing to normalize the data, which is then transformed into n-gram vectors. This step is crucial for capturing the lexical features of the device names.

Similarity Assessment: Subsequently, we compute similarity scores between pairs of device names using these n-gram vectors.

Similarity Threshold: A predefined threshold for similarity is established. Device pairs whose similarity scores surpass this threshold are deemed similar.

Label Assignment for Non-Fingerprinted Devices: For devices that lack device type, we examine the labels of known devices that have been identified as similar. The label most frequently occurring among these devices is then assigned to the unknown device.

Referring to FIG. 2, we encounter a device named "Vinods-Ipad," whose device type is unknown. The disclosed processing technique identifies two other devices with similar names, each previously categorized. Given that both devices fall into the "non-IoT" category, the "Vinods-Ipad" is likewise labeled as "non-IoT." In scenarios in which a device shares similarities with an equal number of devices across different categories, it is classified as "unknown."

In experiments with one month of our DNS customer data, the name-based classifier achieved a high precision rate of 0.97. However, its applicability is limited to 27% of devices within the network, constrained by the availability of the "device_name" field.

Figure 3:
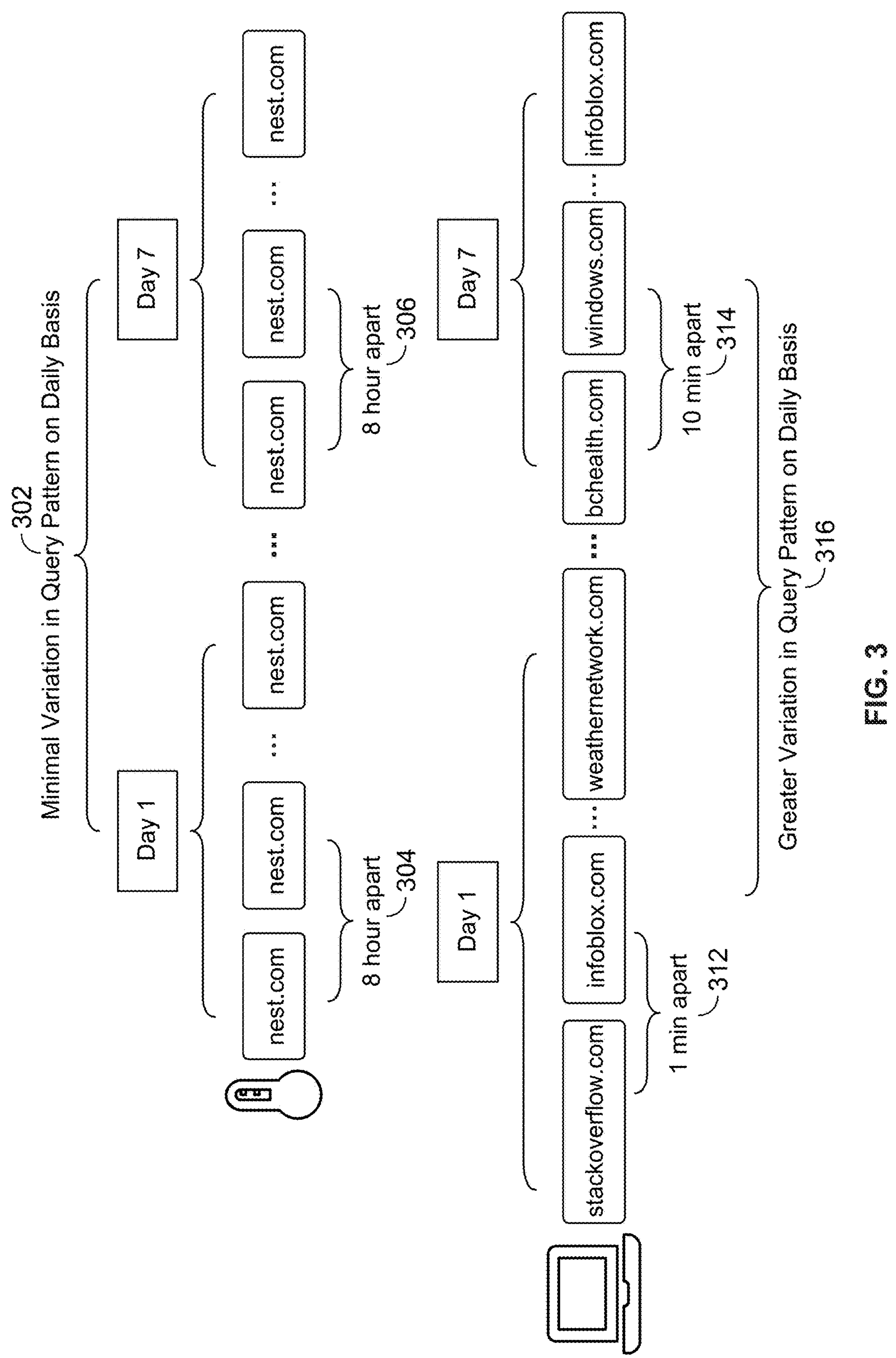
FIG. 3 illustrates example stat-based classifier extracted patterns generated by the system for providing device classification using DNS queries in accordance with some embodiments.

FIG. 3 illustrates example stat-based classifier extracted patterns generated by the system for providing device classification using DNS queries in accordance with some embodiments. Specifically, FIG. 3 provides a snapshot illustrating how the stat-based classifier extracts patterns from the device's DNS activity to build the feature vector for the classifier.

Stat-Based Classifier

We present a pioneering classification methodology, termed the stat-based classifier. This innovative approach generates features predicated on the way devices execute DNS queries, as opposed to the queries themselves. The fundamental premise is that autonomous devices display predictable and consistent patterns, such as executing queries at specific times of the day. The feature generation process involves measuring the time intervals between consecutive queries executed by a device. Specifically, for each device, we record the timestamps of its DNS queries over a period. By calculating the intervals between these timestamps, we can derive the average time interval and the standard deviation of these intervals over a 24-hour period. This provides insights into the regularity and predictability of the device's query patterns.

This procedure is replicated for, for example, a week's worth of data, evaluating how the average and standard deviation of various metrics fluctuate daily.

The metrics include the following:

(1) Query Size: The total DNS queries sent by the device.

(2) Distinct Query Size: The number of unique queries sent by the device.

(3) Time difference between every two consecutive queries.

Referring to FIG. 3, by analyzing these features, a profile of the device's querying behavior can be automatically generated. Devices with minimal variation in their query patterns, such as a thermostat querying nest.com at regular intervals, such as shown at 302, 304, and 306, can then, as a result, be effectively and efficiently distinguished from those devices with greater variability in their query patterns, such as a personal computer querying a wide range of domains, such as shown at 312, 314, and 316. These features are then fed into a HistGradientBoosting classifier, such as similarly described above.

The strength of the stat-based classifier lies in its ability to capture these temporal and behavioral patterns, which are often overlooked by traditional domain-based classifiers. While the standalone performance of this classifier may not significantly surpass that of Second-Level Domain (SLD)-based classifiers, its integration with SLD-based classifiers results in enhanced performance.

In experiments using data from one month of our customer DNS activity, when combined, the complementary strengths of the stat-based and SLD-based classifiers achieve a precision of 0.96 and a recall of 0.91, which are reported as the final classification label. This amalgamation leverages the predictable query patterns of autonomous devices and the domain-based analysis of SLD classifiers to provide a robust and accurate classification system.

In summary, the stat-based classifier offers a novel approach to device classification by focusing on the temporal dynamics of DNS queries, providing an additional layer of analysis that enhances the overall classification accuracy when integrated with traditional SLD-based methods.

Ensemble Approach

Here we take a novel approach borrowing from a technique in eCommerce typically used for product recommendations. In collaborative filtering you learn from similar users with overlapping past product views or purchases to predict what future items may be of interest. Furthermore, user demographic metadata such as age, gender, location, etc. can be incorporated into the model to refine predictions. A byproduct of various collaborative filtering approaches is user embeddings, a geometric point-in-space representation of the user, placing them close to similar users. To use this approach applied to our use case, we make an analogy between the following:

eCom users↔the devices on our networks;

previous product interactions↔SLDs being queried; and user metadata↔frequency statistics.

The outcome is not to predict what SLDs a device may query next, but rather to learn quality embeddings for the devices on our networks to be used for device classification.

DNS queries over a seven-day period were gathered and device "ratings" for each queried SLD were computed. The device rating for any SLD is the proportion of its queries that are to that SLD. In a matrix factorization approach, a user-item ratings matrix is formed and then factorized to produce dense embeddings for the users, as well as the items. Users who like certain genres of, say, movies should cluster together in embedding space. The aim here is that similar devices should equally well cluster together (e.g., Kyocera printers should be close to other Kyocera printers). Summarizing statistics, such as mean, median, min, max, variance, and various percentiles, were computed on time deltas between successive queries over the same time period. To incorporate these into the embeddings, a factorization machine approach was used. Each sample for the model to learn from was thus a device, together with its frequency statistics, and its rating for a particular SLD. The recommender model was trained in Apache Spark and device embeddings were produced, and then indexed in a local vector database.

The factorization machine approach co-embeds users together with SLDs and the other statistics features. When an unknown device is on the network, an embedding can be reconstructed for it via a weighted sum of the SLDs which it has queried and statistics that have been observed. This places the device somewhere in embedding space, and we can query the vector database to see which device is most like it. If it falls suitably close to its nearest neighbor (e.g., within a threshold distance), then we predict it is the same type of device.

This approach allows us to make multi-faceted predictions. By indexing devices in the vector database for which we have various levels of granularity of information, we can predict at those various levels of granularity. For instance, when we have indexed a device with a DHCP fingerprint that includes the vendor, model of the device, and operating system, all those attributes are available for prediction for unknown devices found to be suitably close to it in embedding space. As in any machine learning model there will be errors. We would not expect the SLDs queried, nor query frequencies, between a user on a Lenovo ThinkPad or a Dell Latitude to be so different that we could learn embeddings which clearly distinguish the two. Grouping related devices into categories such as computers (laptops or desktops), smart phones, VOIP phones, printers, smart TVs, etc. provides a level of granularity which refines previous work and adds new insights for customers. We did precisely this using GPT-4 to create a mapping between DHCP fingerprints and these categories making these categories also available for us to predict. The predictions for device type, as well as vendor and operating system, can then be surfaced to users in cases where the model precision has been determined to be sufficiently high on a test set.

Based on our experiments, the results vary depending on which DNS related product the data was collected from. The classification precision for predicting printers, for instance, has been observed to be 0.97 based on evaluation on logged DDI data, and similarly VOIP and teleconferencing devices were measured to have a precision of 0.98. When considering all operating systems, vendors, and device types, we quickly see this as a multi-class classification problem with a very large number of classes, but we have found many of these labels for which we will now be able to identify with suitably high confidence previously unknown devices on our networks.

Various process embodiments for device classification using DNS queries will now be further described below.

Example Process Embodiments for Device Classification Using DNS Queries

Figure 4:
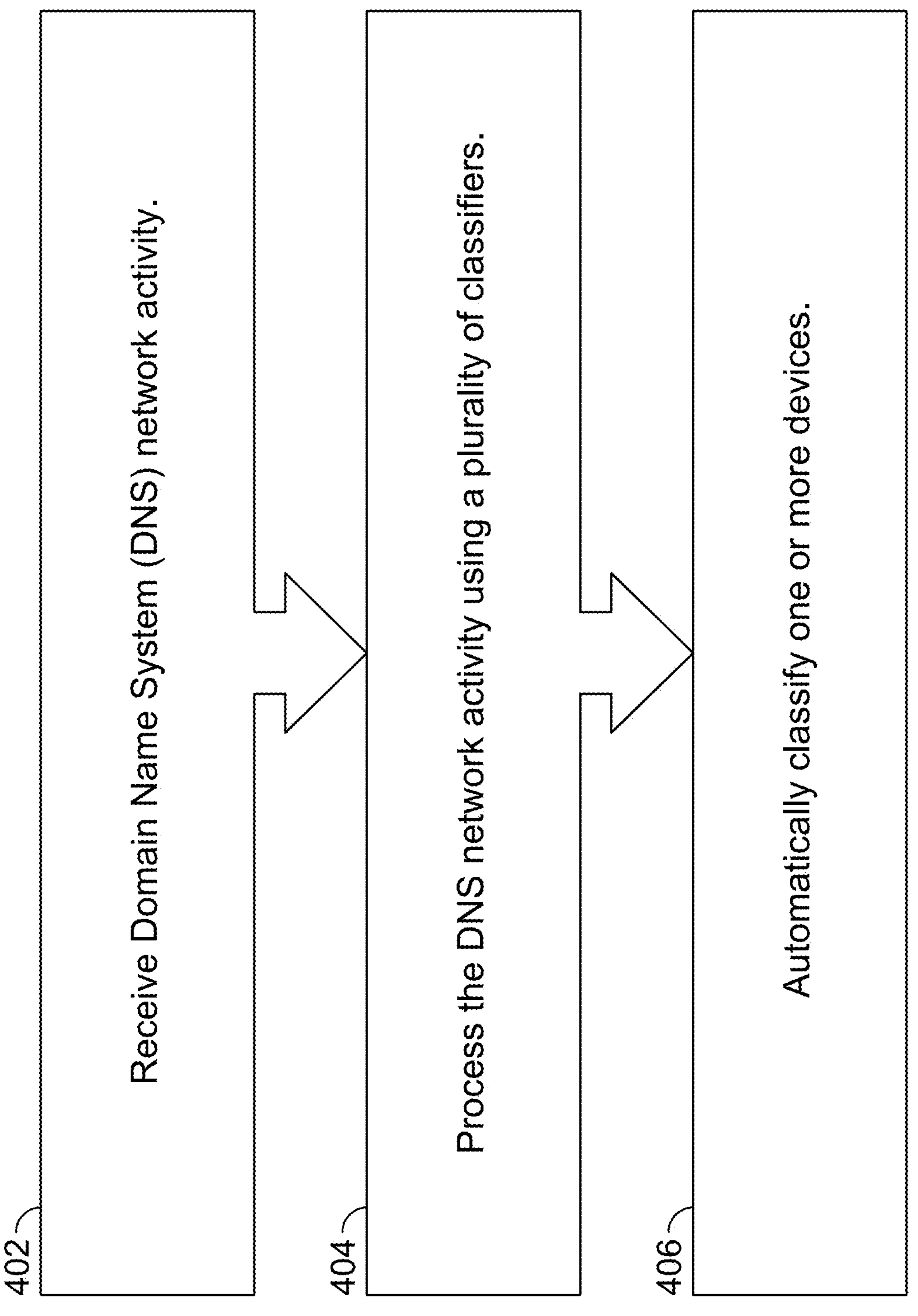
FIG. 4 is a flow diagram for device classification using DNS queries in accordance with some embodiments.

FIG. 4 is a flow diagram for device classification using DNS queries in accordance with some embodiments. In some embodiments, a process as shown in FIG. 4 is performed by the above-described system for device classification using DNS queries (e.g., including the multiple classifiers and/or other components), and techniques as similarly described above including the embodiments described above with respect to FIGS. 1-3.

At 402, Domain Name System (DNS) network activity is received. The DNS network activity can include a plurality of DNS queries.

At 404, processing the DNS network activity using a plurality of classifiers is performed. For example, the above-described four distinct classifiers can be used to facilitate automated device classification, such as similarly described above with respect to FIGS. 1-3.

At 406, automatically classifying one or more devices is performed. For example, an unknown device can be categorized into one of a plurality of distinct device categories, such as similarly described above with respect to FIGS. 1-3.

Figure 5:
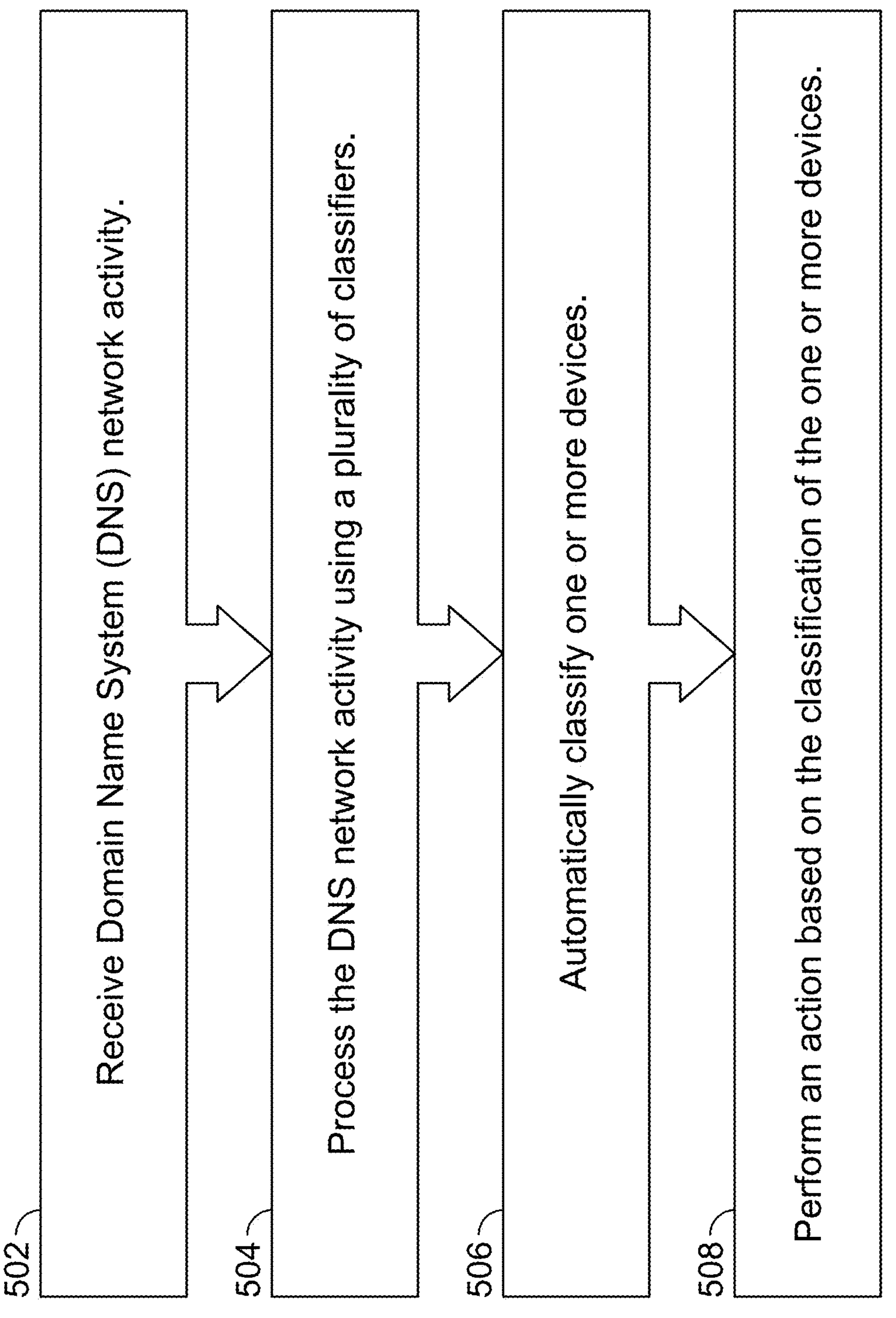
FIG. 5 is another flow diagram for device classification using DNS queries in accordance with some embodiments.

FIG. 5 is another flow diagram for device classification using DNS queries in accordance with some embodiments. In some embodiments, a process as shown in FIG. 5 is performed by the above-described system for device classification using DNS queries (e.g., including the multiple classifiers and/or other components), and techniques as similarly described above including the embodiments described above with respect to FIGS. 1-3.

At 502, Domain Name System (DNS) network activity is received. The DNS network activity can include a plurality of DNS queries.

At 504, processing the DNS network activity using a plurality of classifiers is performed. For example, the above-described four distinct classifiers can be used to facilitate automated device classification, such as similarly described above with respect to FIGS. 1-3.

At 506, automatically classifying one or more devices is performed. For example, an unknown device can be categorized into one of a plurality of distinct device categories, such as similarly described above with respect to FIGS. 1-3.

At 508, an action is performed based on the classification of the one or more devices. For example, a classified device can be added to an allow list or to a block list based on a security policy for the enterprise network. Various other example actions can be similarly performed based on the classification of the one or more devices (e.g., quarantine, log for further security analysis, report to a user/admin, and/or other actions).

Various embodiments are also disclosed for applying the above-described system and computer-implemented processes for providing device anomaly detection based on DNS queries as will be further described below.

Overview of Techniques for Device Anomaly Detection Based on DNS Queries

Various techniques for providing device anomaly detection based on DNS queries are disclosed. The disclosed solution can be implemented in various system, process, and/or computer program embodiments, such as will be further described below with respect to various embodiments.

In some embodiments, device anomaly detection based on DNS queries utilizes the results of the device classification using DNS queries as an input to then further perform the further disclosed techniques for providing device anomaly detection based on DNS queries as will now be further described below.

In a recent study by Forrester Consulting, it was revealed that 69% of enterprises now have more Internet of Things (IoT) devices than conventional hardware, with 67% experiencing IoT security incidents in the past. This surge in IoT devices, evident in sectors like connected cars, smart cities, and industrial projects, is set to rise further. The difficulty in identifying malware and security threats within IoT infrastructure is heightened by the limited hardware capabilities of these devices, which restrict the installation of advanced endpoint security software. Consequently, monitoring network behavior is critical for early threat detection and mitigation, with anomaly detection (e.g., which can include identifying deviations from typical device behavior) being pivotal in uncovering unknown threats in IoT ecosystems, enterprise networks generally, and/or other monitored networks (e.g., government networks, home networks, etc.).

The existing security methods use approaches, such as network traffic analysis and endpoint protection, to find anomalous end points (see, e.g., A. Mohana et al., "Anomaly detection in Network Traffic Using Unsupervised Machine learning Approach," ICCES 2020; G. Karatas et al., "Deep Learning in Intrusion Detection Systems", IBIGDELFT 2018; Ge, Mengmeng et al., "Deep Learning-Based Intrusion Detection for IoT Networks," PRDC 2019).

However, existing approaches to detect anomalies are often infeasible for IoT devices due to several factors. First, network traffic analysis methods, including packet and flow analysis, generally require extensive data collection infrastructure, which can be complex. Second, IoT devices generally have restricted processing power and storage, unsuitable for traditional endpoint protection software. Third, the wide variety of operating systems (OSs) and hardware and communication protocols in IoT devices makes it challenging to develop universal security solutions. Fourth, the minimal or absent user interfaces in many IoT devices make managing security measures, such as software/firmware updates, technically challenging. Fifth, with the increasing use of encryption in network communications (e.g., HTTPS), visibility into traffic content associated with such IoT devices is reduced.

Accordingly, to address these technical challenges associated with enhanced security for IoT devices, we have developed a new and improved anomaly detection technique using DNS queries (e.g., including DNS logs history). The disclosed techniques for device anomaly detection based on DNS queries, in an example implementation, utilize statistics and machine learning to facilitate identification of normal behavior patterns for specific devices to thereby detect deviations/anomalous activities/behaviors without disrupting device functionality. As such, the disclosed techniques employ a passive approach, respectful of privacy, and adaptable to various device types, such as will be further described below.

In some embodiments, a system, a process, and/or a computer program product for device anomaly detection based on DNS queries includes receiving Domain Name System (DNS) network activity, wherein the DNS network activity includes a plurality of DNS queries; processing the DNS network activity to generate a plurality of metrics; and automatically detecting anomalies associated with one or more devices for a monitored network. For example, such anomaly detection can include identifying deviations from typical device behavior (e.g., for IoT devices and/or other network enabled devices communicated on an enterprise network or other monitored network).

In some embodiments, the plurality of metrics includes a DNS query count.

In some embodiments, the plurality of metrics includes a unique second-level domain (SLD) count.

In some embodiments, the plurality of metrics includes a DNS query count and a unique second-level domain (SLD) count.

In some embodiments, the one or more devices are classified using a plurality of classifiers, and the plurality of classifiers includes a second-level domain (SLD)-based classifier.

In some embodiments, the one or more devices are classified using a plurality of classifiers, and wherein the plurality of classifiers includes a name-based classifier.

In some embodiments, the one or more devices are classified using a plurality of classifiers, and wherein the plurality of classifiers includes a second-level domain (SLD)-based classifier and a name-based classifier that are applied to collaboratively determine whether the one or more devices belong to an Internet of Things (IoT) category or a non-IoT category.

In some embodiments, the one or more devices are classified using a plurality of classifiers, and wherein the plurality of classifiers includes a statistical (stat)-based classifier.

In some embodiments, the one or more devices are classified using a plurality of classifiers, and wherein the plurality of classifiers includes an ensemble-based classifier.

In some embodiments, the one or more devices are classified using a plurality of classifiers, wherein the plurality of classifiers includes a second-level domain (SLD)-based classifier and a name-based classifier that are applied to collaboratively determine whether the one or more devices belong to an Internet of Things (IoT) category or a non-IoT category, and wherein the plurality of classifiers further includes an ensemble-based classifier that is applied to further categorize the one or more devices into specific device types.

In some embodiments, the one or more devices are classified using a plurality of classifiers, wherein the plurality of classifiers includes a second-level domain (SLD)-based classifier and a name-based classifier that are applied to collaboratively determine whether the one or more devices belong to an Internet of Things (IoT) category or a non-IoT category, and wherein the plurality of classifiers further includes an ensemble-based classifier that is applied to further categorize the one or more devices into specific device types that include laptops, printers, and/or cameras.

In some embodiments, the anomaly detection for the one or more devices is sent to a cloud-based DNS security.

In some embodiments, a system, a process, and/or a computer program product for device anomaly detection based on DNS queries further includes performing an action based on the anomaly detection for the one or more devices. For example, a detected anomalous device can be added to a block list based on a security policy for the enterprise network. Various other example actions can be similarly performed based on the anomaly detection associated with the one or more devices (e.g., quarantine, log for further security analysis, report to a user/admin, and/or other actions).

In some embodiments, a system, a process, and/or a computer program product for device anomaly detection based on DNS queries further includes blocking the one or more devices for at least a predetermined period of time based on a DNS security policy in response to the anomaly detection.

In some embodiments, a system, a process, and/or a computer program product for device classification using DNS queries further includes reporting the one or more devices for at least a predetermined period of time based on a DNS security policy in response to the anomaly detection.

Thus, new and improved techniques for device anomaly detection based on DNS queries are further described below.

Example System Embodiments for Device Anomaly Detection Based on DNS Queries

Example system embodiments for providing device anomaly detection based on DNS queries are disclosed. The disclosed new techniques for device classification using DNS queries provide significant improvements over the existing, conventional approach.

Figure 6:
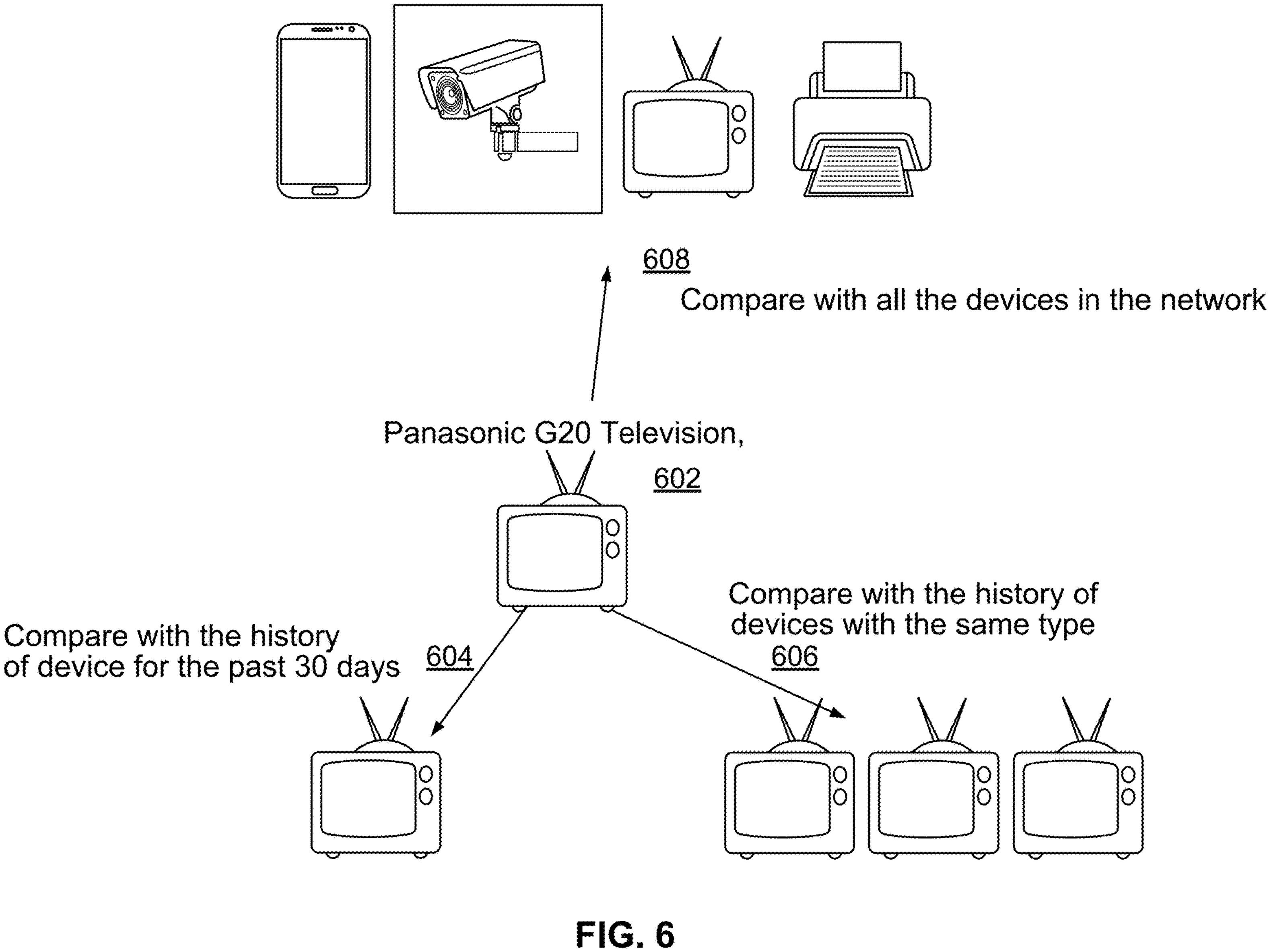
FIG. 6 illustrates three different analysis scopes for comparison of statistical metrics that are applied for providing for device anomaly detection based on DNS queries in accordance with some embodiments.

FIG. 6 illustrates three different analysis scopes for comparison of statistical metrics that are applied for providing for device anomaly detection based on DNS queries in accordance with some embodiments. As will now be further described below, the disclosed techniques for device anomaly detection based on DNS queries, in an example implementation, utilize statistics and machine learning (ML) to facilitate identification of normal behavior patterns for specific devices to thereby detect deviations/anomalous activities/behaviors without disrupting device functionality.

Anomaly Detection

Anomaly detection is performed based on monitoring the behavior of network enabled devices, such as Internet of Things (IoT) devices. The disclosed techniques of anomaly detection are applied in the disclosed embodiments specifically for IoT devices. It has been observed based on our experiments that IoT devices, unlike those devices frequently interacted with by humans (e.g., laptops/computers, smart phones, etc.), exhibit more consistent and predictable behavior patterns, making it easier to identify deviations from their standard activities (e.g., anomalous activities/behaviors). However, as would be apparent to one of ordinary skill in the art in view of the disclosed embodiments that the disclosed techniques can similarly be applied to other network enabled devices and are not limited to IoT devices.

Data Collection and Analysis

The data collection and analysis primarily utilizes DNS data from IoT devices, collected over a period (e.g., the previous month or some other period of time). In particular, the disclosed techniques focus on specific statistics, notably the DNS query count, which represents the total number of DNS domains a device has queried over a given period (e.g., hourly or daily, etc.). We also analyze the unique SLD count, defined as the total number of distinct second-level domains (SLDs) queried by a device. These metrics are chosen for their ability to summarize general activity patterns in device behavior (e.g., or other similar or additional metrics based on DNS data associated with the IoT devices can similarly be used for anomaly detection).

In this example implementation, the SLD queries of a device are also collected to enhance anomaly detection capabilities, and adopt an anomaly metric using a state of the art natural language processing (NLP) technique, such as will be further described below.

Anomaly Detection Metrics Using DNS Activity Statistics

Referring now to FIG. 6, statistical anomalies in IoT device behavior are primarily indicated by irregularities in two key metrics: (1) DNS query count; and (2) unique SLD (Second-Level Domain) count. In this example implementation, these metrics are analyzed within specific 'analysis scopes'—a term that is used herein to denote the different contexts for evaluating a device's DNS queries. These analysis scopes include a device's (e.g., such as for a device 602 as shown in FIG. 6) individual activity history, such as shown at 604 in FIG. 6, the collective history of similar device types (e.g., printers or cameras) (e.g., identifying similar device types using the techniques for device classification using DNS queries as similarly described above with respect to FIGS. 1-5), such as shown at 606 in FIG. 6, and the general activity across all network devices for each customer, such as shown at 608 in FIG. 6. FIG. 1 in our documentation provides a visual representation of these scopes, illustrating how device activities are compared within each.

Figure 7:
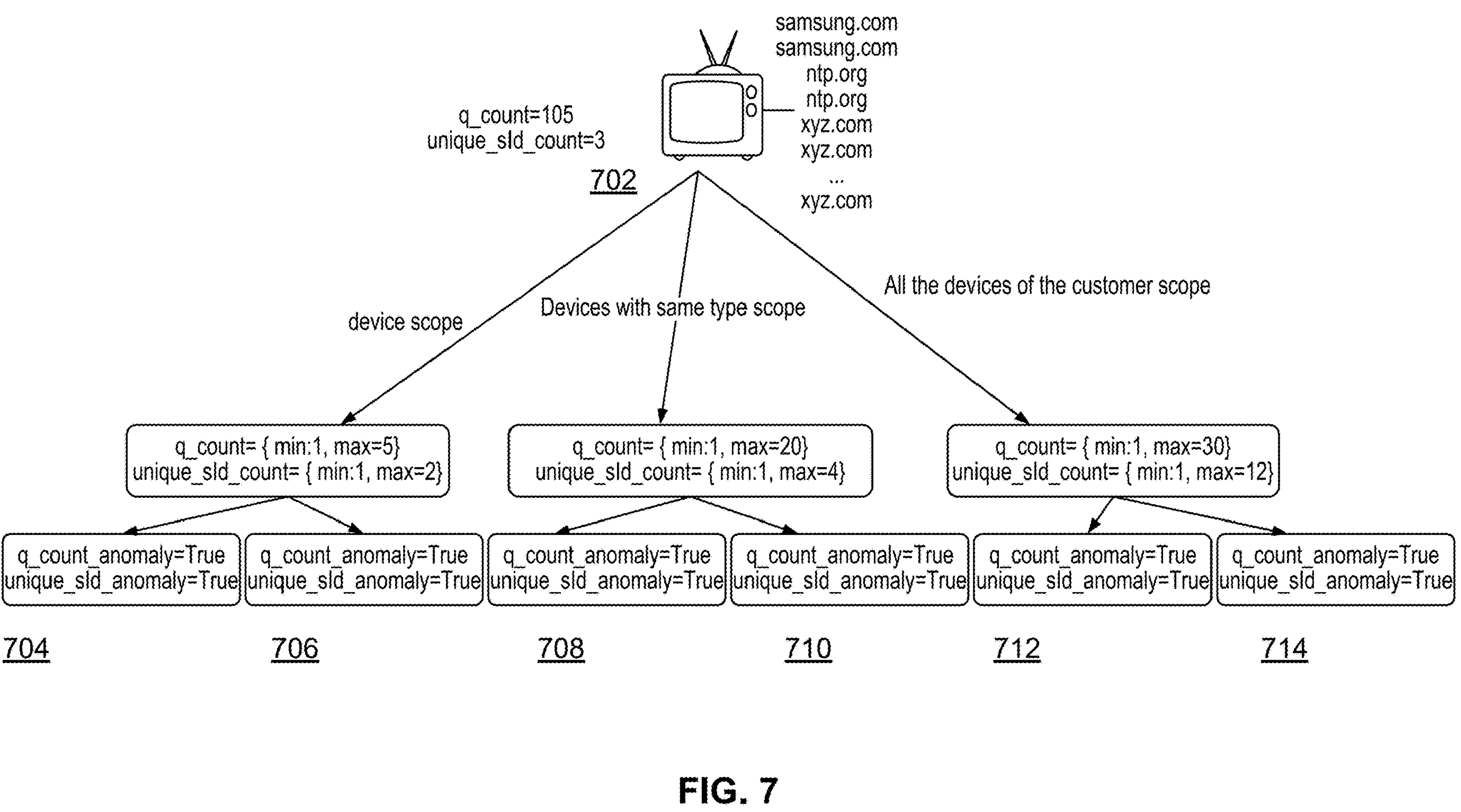
FIG. 7 illustrates an example of driving six anomaly metrics using different analysis scopes for comparison of statistical metrics that are applied for providing for device anomaly detection based on DNS queries in accordance with some embodiments.

FIG. 7 illustrates an example of driving six anomaly metrics using different analysis scopes for comparison of statistical metrics that are applied for providing for device anomaly detection based on DNS queries in accordance with some embodiments.

In this example implementation, the monitoring system focuses on the two metrics (i.e., DNS query count and unique SLD count) across three different scopes (i.e., (1) device scope, (2) devices with same device type scope, and (3) all devices of the customer scope, such as all devices on the monitored customer's enterprise network(s)), resulting in six distinct anomaly detection metrics, such as for a device 702, as shown at 704, 706, 708, 710, 712, and 714 in FIG. 7. Each metric has clearly defined parameters for what constitutes normal behavior. For example, values within the range of the third quartile (Q3) plus 1.5 times the interquartile range (IQR) to the first quartile (Q1) minus 1.5 times the IQR are considered normal (e.g., or other thresholds can similarly be used for specifying normal ranges). Values outside this range are flagged as anomalies. As such, FIG. 7 demonstrates how these six metrics are constructed from the collected statistics in this example implementation.

Figure 8:
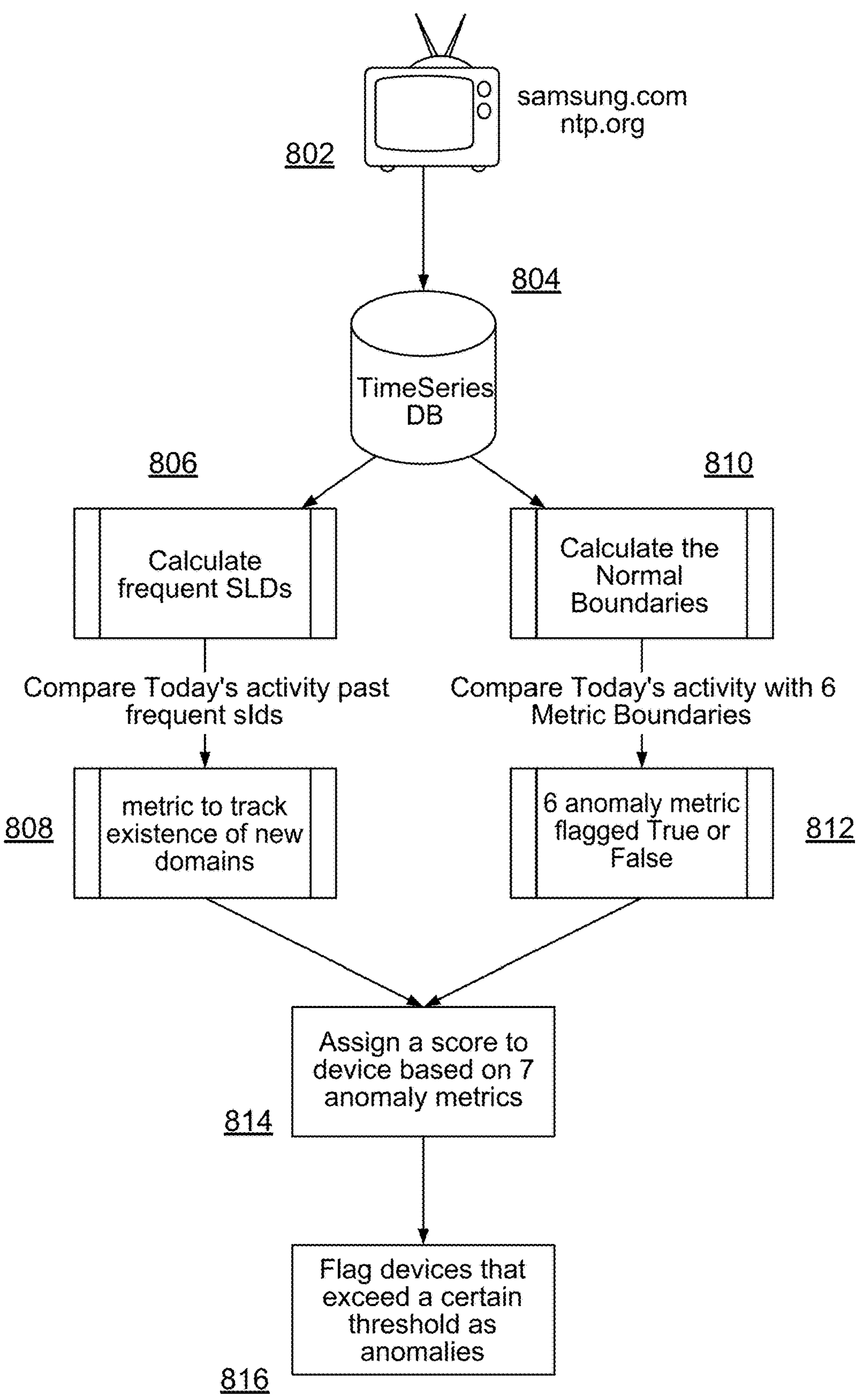
FIG. 8 illustrates an example of an anomaly detector processing workflow for providing for device anomaly detection based on DNS queries in accordance with some embodiments.

FIG. 8 illustrates an example of an anomaly detector processing workflow for providing for device anomaly detection based on DNS queries in accordance with some embodiments.

Referring to FIG. 8, processing for a given device, such as shown at 802, begins with collecting DNS related data from a time series data store, shown as time series database 804.

Anomaly Detection Metric Using Second-Level Domains (SLDs)

For example, an allow-list can be automatically generated for each device based on its history. Specifically, the disclosed techniques can be applied to automatically determine the common second-level domains (SLDs) for each device, which can then be automatically added to an allow-list for the device (e.g., and/or the device type, etc.).

To identify typical SLDs within a device's DNS history, a technique commonly applied in natural language processing (NLP) can be performed, which is the Inverse Document Frequency (IDF) method. IDF processing has traditionally been used to identify the relative importance of words within documents.

However, as applied herein for identifying typical SLDs with a device's DNS history, the IDF value for each SLD is calculated, considering domains with an IDF score below a certain threshold as part of the allow list. As such, these are akin to common, less significant words in NLP, indicating that the SLD is frequently used and not uniquely indicative of anomalous activity.

In this example implementation, the processing begins with focusing exclusively on the DNS history of the individual device to ascertain its normal SLDs. Specifically, calculating frequent SLDs from the time series DNS related data is performed as shown at 806. This establishes our initial list of frequent SLDs, representing the most common and less significant SLDs for that specific device. Subsequently, we broaden our scope to include devices of the same type (e.g., such as similarly described above with respect to FIG. 7), analyzing their DNS histories to compile a second list of normal SLDs for that category. Finally, we extend our analysis to encompass devices belonging to the same customer, generating a third list of frequent SLDs. As shown at 808, a seventh metric (e.g., in addition to the six metrics described above with respect to FIG. 7) is generated to track the existence of new domains based on comparing today's activity to past frequent SLDs.

These three lists, derived sequentially from different levels of aggregation—individual device, device type, and customer—provide a comprehensive perspective on what constitutes normal or insignificant SLDs in varying contexts, such as shown at 810, which includes calculating the normal boundaries. As shown at 812, the six anomaly metrics (e.g., as shown and described above with respect to FIG. 7) are flagged as either true or false.

Aggregating Anomalous Scores

In this example implementation, the findings from all seven metrics are synthesized to calculate an 'Anomalous Score' for each IoT device as shown at 814 in FIG. 8. This score is determined by the number of these metrics that signal abnormal behavior for a specific device on a given day.

To illustrate, consider the Anomalous Score as a form of consensus among the different metrics. For example, if most of them indicate abnormality, the overall score reflects a higher likelihood of anomalous behavior. The disclosed technique can be visualized as a majority voting system, where each metric effectively votes on whether the device's behavior is normal or abnormal.

However, it is important to note that this majority voting approach is just one way to aggregate these metrics. In different scenarios or for varying sensitivity requirements, alternative methods of combination can be employed. For example, certain metrics can be weighted more heavily if they are deemed more critical in identifying specific types of anomalies. As another example, a weighted average can be used.

As shown at 816 in FIG. 8, devices that exceed a certain (e.g., configurable predetermined) threshold are identified as anomalies (e.g., exhibiting anomalous activity/behavior).

Challenges in Anomaly Validation

Anomaly detection in IoT devices confronts a fundamental challenge: the absence of a definitive ground truth. In our dataset, we lack pre-labeled instances of what constitutes normal versus anomalous device behavior. This is a common scenario in unsupervised learning contexts, where the data does not come with predefined labels or categories. The absence of this ground truth makes it technically challenging to objectively validate the anomalies detected by the disclosed automated anomaly detection techniques.

Furthermore, the dynamic and diverse nature of IoT devices adds complexity to this technical challenge. Different types of IoT devices often have varying normal behaviors, and what may be anomalous for one could be normal/standard for another. This variability necessitates a nuanced approach to validation, such as will now be described below.

Validation: Case Studies Methodology

Given these constraints, we conduct a case study-based methodology to validate the anomalies identified by our system. This approach involves the following steps as described below.

Selection of Case Studies: We start by selecting a sample of devices that our system has marked as anomalous. From our dataset, we identify instances where the anomaly score was significantly higher than the norm.

Comparison with Similar Device Types: For each selected anomalous device, we identify a corresponding normal device, that is, a device of the same type and with similar usage patterns but without an anomalous score. This comparative analysis helps to highlight the contrasting behaviors.

Behavioral Analysis: We conduct a detailed analysis of the DNS query patterns of both the anomalous and the normal devices. This includes examining metrics such as query size, frequency of unique queries, and interactions with different Second-Level Domains (SLDs).

Identification of Anomaly Indicators: Through this comparative analysis, we aim to identify specific patterns or characteristics in the DNS queries that could explain why a device was flagged as anomalous. This may include unusual query sizes, unexpected SLD interactions, or other deviations from the established patterns observed in normal devices.

Expert Review: The results of these case studies are then reviewed by cybersecurity experts. This review seeks to validate whether the identified anomalies correspond to plausible security concerns or operational issues within the IoT ecosystem.

Iterative Refinement: Based on the insights gained from these case studies and expert feedback, we refine our anomaly detection techniques to enhance their accuracy and reduce false positives. An example of iterative refinement is based on a combination of human in the loop feedback, in which a human provides feedback on the anomaly, and whether the detected anomaly is actually an anomaly. That human feedback is provided back into the disclosed detectors to refine detections.

Findings from Case Studies

In our case studies, observations were made regarding devices that our system had identified with high anomaly scores. Upon closer examination of their DNS queries, we discovered that these devices were accessing domains known to be associated with malicious activities. These domains were distinctly out of character for the typical operations of IoT devices. This pattern was not just an anomaly but a clear deviation towards behavior that could not be logically associated with any standard, legitimate functions of normal IoT devices. This discovery validates the efficacy of the disclosed anomaly detection system and techniques, indicating its potential in identifying real-world security threats within IoT ecosystems.

Various process embodiments for device anomaly detection based on DNS queries will now be further described below.

Figure 9:
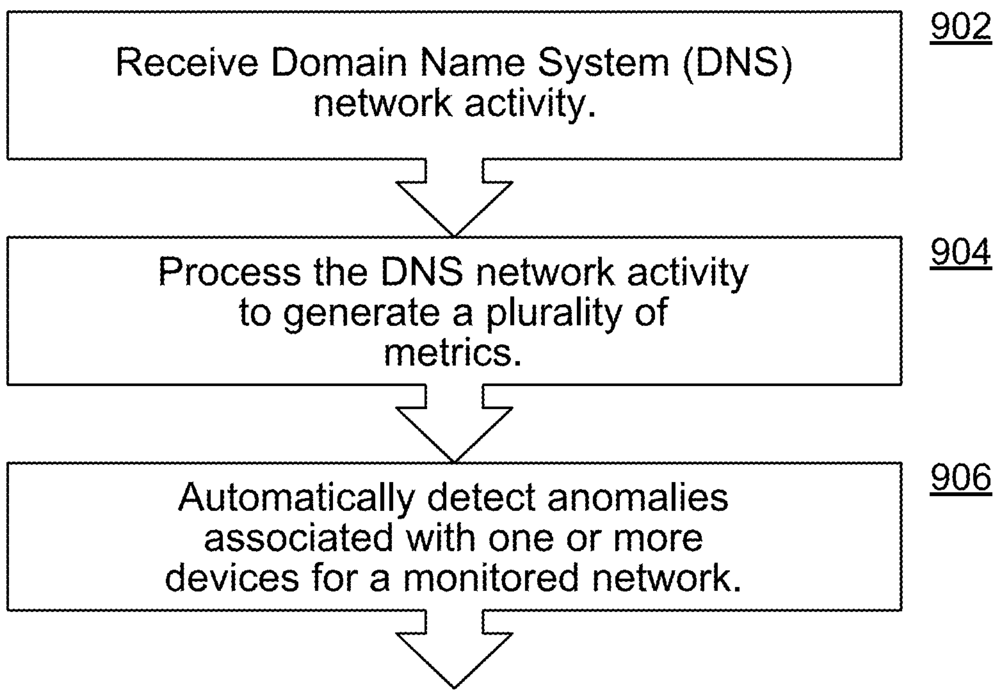
FIG. 9 is a flow diagram for device anomaly detection based on DNS queries in accordance with some embodiments.

Example Process Embodiments for Device Anomaly Detection Based on DNS Queries FIG. 9 is a flow diagram for device anomaly detection based on DNS queries in accordance with some embodiments. In some embodiments, a process as shown in FIG. 9 is performed by the above-described system for device anomaly detection based on DNS queries (e.g., including the multiple classifiers and/or other components), and techniques as similarly described above including the embodiments described above with respect to FIGS. 1-3 and 6-8.

At 902, Domain Name System (DNS) network activity is received. The DNS network activity can include a plurality of DNS queries.

At 904, processing the DNS network activity to generate a plurality of metrics is performed. For example, the above-described two key metrics: (1) DNS query count; and (2) unique SLD (Second-Level Domain) count can be used to facilitate automated device anomaly detection, such as similarly described above with respect to FIGS. 6-8.

At 906, automatically detecting anomalies associated with one or more devices for a monitored network is performed. For example, a device that exhibits behaviors that are not normal for its prior DNS related activities/behaviors and/or normal for devices of the same device type (e.g., and/or not normal for other devices on the monitored enterprise network) can be used to facilitate an anomaly detection, such as similarly described above with respect to FIGS. 6-8.

Figure 10:
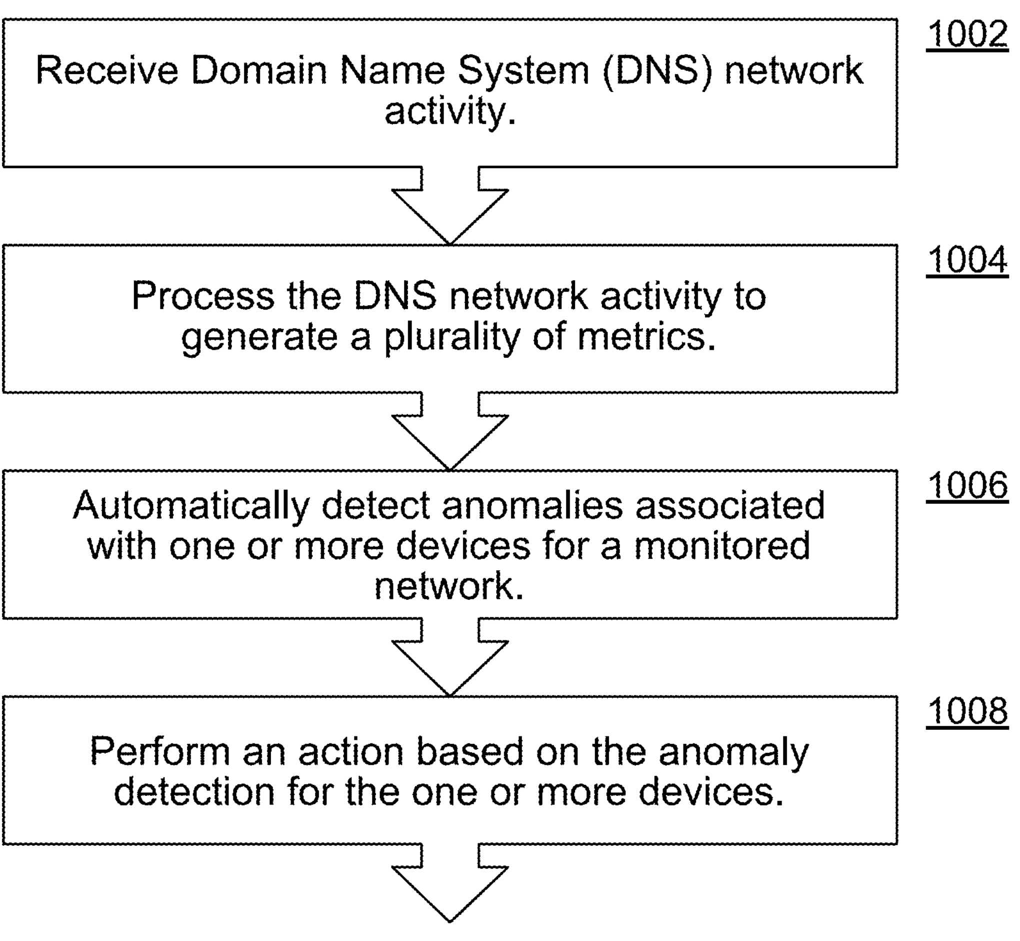
FIG. 10 is another flow diagram for device anomaly detection based on DNS queries in accordance with some embodiments.

FIG. 10 is another flow diagram for device anomaly detection based on DNS queries in accordance with some embodiments. In some embodiments, a process as shown in FIG. 10 is performed by the above-described system for device anomaly detection based on DNS queries (e.g., including the multiple classifiers and/or other components), and techniques as similarly described above including the embodiments described above with respect to FIGS. 1-3 and 6-8.

At 1002, Domain Name System (DNS) network activity is received. The DNS network activity can include a plurality of DNS queries.

At 1004, processing the DNS network activity to generate a plurality of metrics is performed. For example, the above-described two key metrics: (1) DNS query count; and (2) unique SLD (Second-Level Domain) count can be used to facilitate automated device anomaly detection, such as similarly described above with respect to FIGS. 6-8.

At 1006, automatically detecting anomalies associated with one or more devices for a monitored network is performed. For example, a device that exhibits behaviors that are not normal for its prior DNS related activities/behaviors and/or normal for devices of the same device type (e.g., and/or not normal for other devices on the monitored enterprise network) can be used to facilitate an anomaly detection, such as similarly described above with respect to FIGS. 6-8.

At 1008, an action is performed based on the anomaly detection for the one or more devices. For example, an anomalous device can be added to a block list based on a security policy for the enterprise network. Various other example actions can be similarly performed based on the classification of the one or more devices (e.g., quarantine, log for further security analysis, report to a user/admin, and/or other actions).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

a processor configured to:

receive Domain Name System (DNS) network activity, wherein the DNS network activity includes a plurality of DNS queries;

process the DNS network activity to generate a plurality of metrics, comprising to:

determine that an inverse document frequency (IDF) score for a second-level domain (SLD) of a device is equal to or less than an inverse document frequency score threshold;

in the event that the IDF score is equal to or less than the inverse document frequency score threshold, add the SLD to an allow list;

generate a first list for frequent SLDs for a device, wherein the frequent SLDs are SLDs that appear more than an average SLD;

generate a second list for normal SLDs for devices of a same type; and generate a third list for frequent SLDs of all device for a same customer; and automatically detect anomalies associated with one or more devices for a monitored network, comprising to:

determine that an anomaly score equal to or greater than an anomaly score threshold, wherein the anomaly score is determined based on the first list, the second list, and the third list; and in response to a determination that the anomaly score is equal to or greater than the anomaly score threshold, determine that the anomalies have occurred; and a memory coupled to the processor and configured to provide the processor with instructions.

2. The system recited in claim 1, wherein the plurality of metrics includes a DNS query count.

3. The system recited in claim 1, wherein the plurality of metrics includes a unique second-level domain (SLD) count.

4. The system recited in claim 1, wherein the plurality of metrics includes a DNS query count and a unique second-level domain (SLD) count.

5. The system recited in claim 1, wherein the one or more devices are classified using a plurality of classifiers, and wherein the plurality of classifiers includes a second-level domain (SLD)-based classifier and a name-based classifier that are applied to collaboratively determine whether the one or more devices belong to an Internet of Things (IoT) category or a non-IoT category.

6. The system recited in claim 1, wherein the one or more devices are classified using a plurality of classifiers, and wherein the plurality of classifiers includes a statistical (stat)-based classifier.

7. The system recited in claim 1, wherein the one or more devices are classified using a plurality of classifiers, and wherein the plurality of classifiers includes an ensemble-based classifier.

8. The system recited in claim 1, wherein the one or more devices are classified using a plurality of classifiers, wherein the plurality of classifiers includes a second-level domain (SLD)-based classifier and a name-based classifier that are applied to collaboratively determine whether the one or more devices belong to an Internet of Things (IoT) category or a non-IoT category, and wherein the plurality of classifiers further includes an ensemble-based classifier that is applied to further categorize the one or more devices into specific device types.

9. The system recited in claim 1, wherein the one or more devices are classified using a plurality of classifiers, wherein the plurality of classifiers includes a second-level domain (SLD)-based classifier and a name-based classifier that are applied to collaboratively determine whether the one or more devices belong to an Internet of Things (IoT) category or a non-IoT category, and wherein the plurality of classifiers further includes an ensemble-based classifier that is applied to further categorize the one or more devices into specific device types that include laptops, printers, and/or cameras.

10. The system recited in claim 1, wherein anomaly detection for the one or more devices is sent to a cloud-based DNS security.

11. The system recited in claim 1, wherein the processor is further configured to:

perform an action based on anomaly detection for the one or more devices.

12. The system recited in claim 1, wherein the processor is further configured to perform the following action in response to anomaly detection for the one or more devices:

block and/or report the one or more devices for at least a predetermined period of time based on a DNS security policy.

13. A method, comprising:

receiving Domain Name System (DNS) network activity, wherein the DNS network activity includes a plurality of DNS queries;

processing the DNS network activity to generate a plurality of metrics, comprising:

determining that an inverse document frequency (IDF) score for a second-level domain (SLD) of a device is equal to or less than an inverse document frequency score threshold;

in the event that the IDF score is equal to or less than the inverse document frequency score threshold, adding the SLD to an allow list;

generating a first list for frequent SLDs for a device, wherein the frequent SLDs are SLDs that appear more than an average SLD;

generating a second list for normal SLDs for devices of a same type; and generating a third list for frequent SLDs of all device for a same customer; and automatically detecting anomalies associated with one or more devices for a monitored network, comprising:

determining that an anomaly score equal to or greater than an anomaly score threshold, wherein the anomaly score is determined based on the first list, the second list, and the third list; and in response to a determination that the anomaly score is equal to or greater than the anomaly score threshold, determining that the anomalies have occurred.

14. The method of claim 13, wherein the plurality of metrics includes a DNS query count.

15. The method of claim 13, wherein the plurality of metrics includes a unique second-level domain (SLD) count.

16. The method of claim 13, wherein the plurality of metrics includes a DNS query count and a unique second-level domain (SLD) count.

17. A computer program product embodied in a non-transitory computer readable medium and comprising computer instructions for:

receiving Domain Name System (DNS) network activity, wherein the DNS network activity includes a plurality of DNS queries;

processing the DNS network activity to generate a plurality of metrics, comprising:

determining that an inverse document frequency (IDF) score for a second-level domain (SLD) of a device is equal to or less than an inverse document frequency score threshold;

in the event that the IDF score is equal to or less than the inverse document frequency score threshold, adding the SLD to an allow list;

generating a first list for frequent SLDs for a device, wherein the frequent SLDs are SLDs that appear more than an average SLD;

generating a second list for normal SLDs for devices of a same type; and generating a third list for frequent SLDs of all device for a same customer; and automatically detecting anomalies associated with one or more devices for a monitored network, comprising:

determining that an anomaly score equal to or greater than an anomaly score threshold, wherein the anomaly score is determined based on the first list, the second list, and the third list; and in response to a determination that the anomaly score is equal to or greater than the anomaly score threshold, determining that the anomalies have occurred.

18. The computer program product recited in claim 17, wherein the plurality of metrics includes a DNS query count.

19. The computer program product recited in claim 17, wherein the plurality of metrics includes a unique second-level domain (SLD) count.

20. The computer program product recited in claim 17, wherein the plurality of metrics includes a DNS query count and a unique second-level domain (SLD) count.

* * * * *